United States Patent [19]  [11] 4,183,127
Suzuki  [45] Jan. 15, 1980

[54] TOP ROLLERS AND METHOD FOR MANUFACTURE THEREOF

[76] Inventor: Takeshi Suzuki, 19, Hacchodori, 4-chome, Toyohashi-shi, Aichi-ken, Japan

[21] Appl. No.: 798,018

[22] Filed: May 18, 1977

[30] Foreign Application Priority Data

May 20, 1976 [JP] Japan .............................. 51-63312[U]

[51] Int. Cl.² ............................................. B21B 13/02
[52] U.S. Cl. .................................... 29/116 R; 308/190
[58] Field of Search ............................ 29/116 R, 116; 308/187.1, 187, 188, 189 R, 190, 199, 200, 201, 215, 216, 217

[56] References Cited

U.S. PATENT DOCUMENTS

| | | | |
|---|---|---|---|
| 2,621,374 | 12/1952 | Waite | 29/116 R |
| 2,635,300 | 4/1953 | Butler | 308/189 R X |
| 2,730,771 | 1/1956 | Beck et al. | 29/116 R |
| 2,884,665 | 5/1959 | Schlums | 308/190 |
| 2,885,247 | 5/1959 | Schlums | 29/116 R X |
| 2,948,024 | 8/1960 | Swanson | 29/116 R |
| 2,979,784 | 4/1961 | Cotchett | 29/116 R |

FOREIGN PATENT DOCUMENTS

| | | | |
|---|---|---|---|
| 506047 | 10/1951 | Belgium | 29/116 R |
| 2061431 | 6/1972 | Fed. Rep. of Germany | 29/116 R |
| 2061434 | 6/1972 | Fed. Rep. of Germany | 29/116 R |
| 449376 | 6/1949 | Italy | 29/116 R |
| 151951 | 4/1968 | U.S.S.R. | 29/116 R |

Primary Examiner—Wayne L. Shedd
Attorney, Agent, or Firm—Burgess, Ryan and Wayne

[57] ABSTRACT

Disclosed is a top roller for use in a fine or rough spinning frame wherein a plurality of rollers or balls are fitted into one of two axially spaced apart annular grooves formed in the exterior side wall of a rotary section of an arbor and retained with a first retainer in circumferentially equidistantly spaced apart relation and are made into direct rolling contact with the interior side wall of a rotary shell with a rubber cot fitted over the rotary section of the arbor, another plurality of rollers or balls are fitted into the other annular groove of the rotary section of the arbor and a complementary annular groove formed in the interior side wall of the rotary shell and retained with a second retainer in circumferentially equidistantly spaced apart relation, and a bearing chamber housing the rollers or bearings between the rotary section of the arbor and the rotary shell is sealed with a cap with an oil hole at one or outer end and with a flanged seal and a shielding ring at the other or inner end. For lubrication lubricant feeding blades are formed integral with the retainer adjacent to the cap and oil supply passages are extended through the arbor between the free ends thereof in opposed relation with the oil hole of the cap and a point intermediate the two annular grooves at the exterior side wall of the rotary section of the arbor. A method for assembly of the top rollers with the above construction is also disclosed.

4 Claims, 15 Drawing Figures

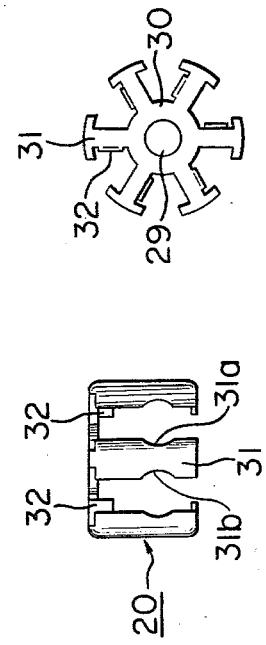
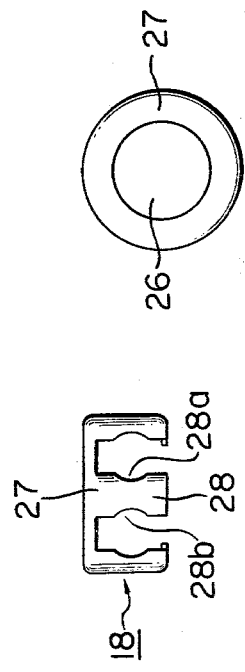
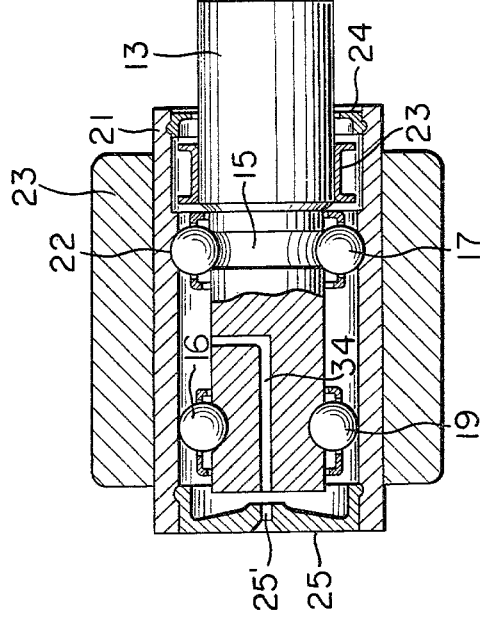

FIG. 6
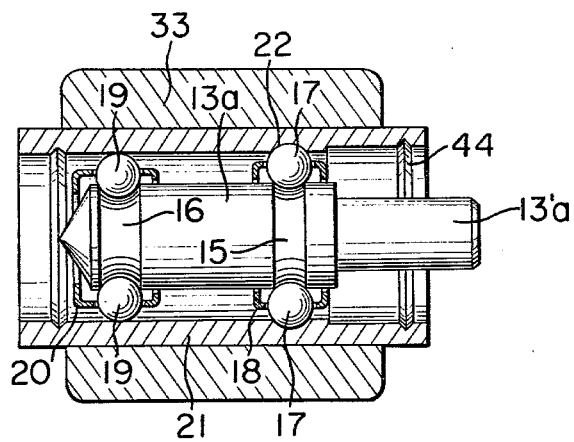
FIG. 7
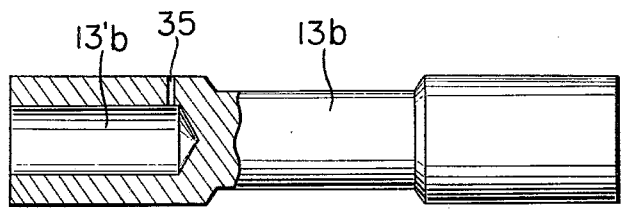
FIG. 9
(A) 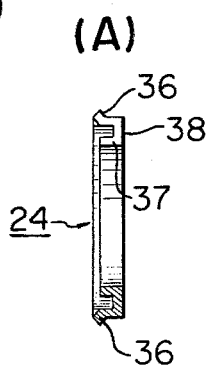   (B) 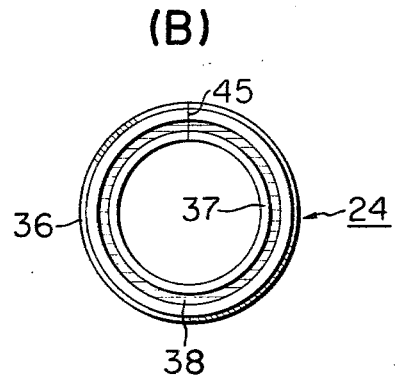
(C) 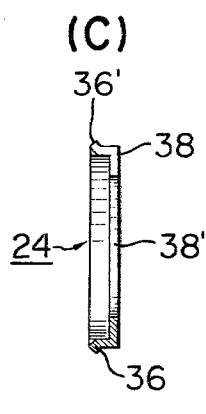   (D) 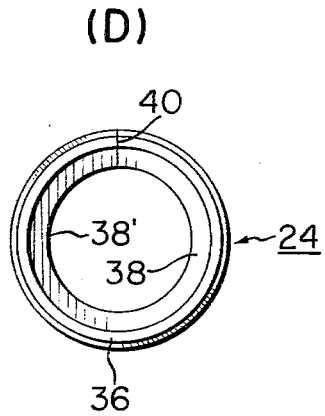

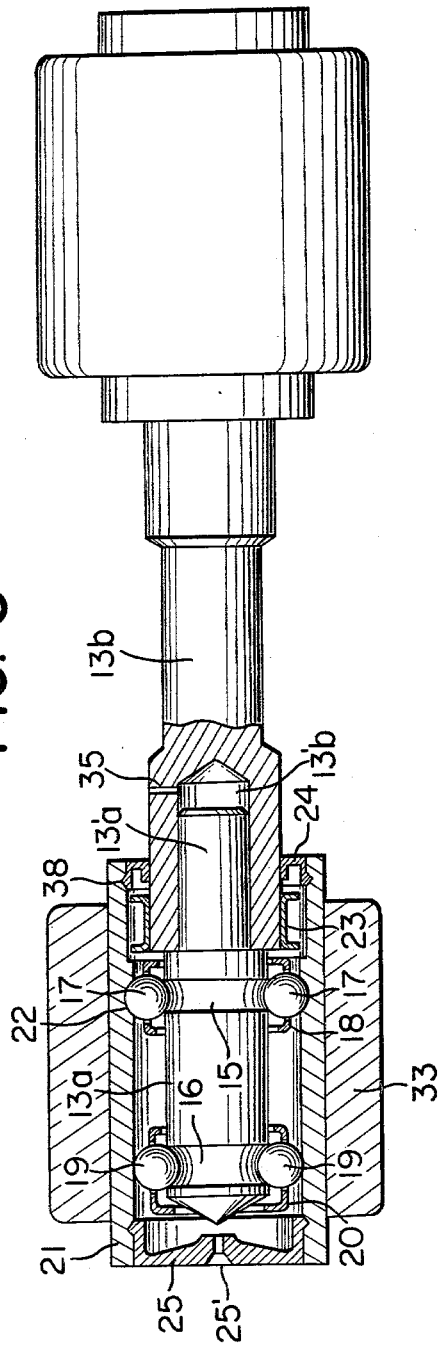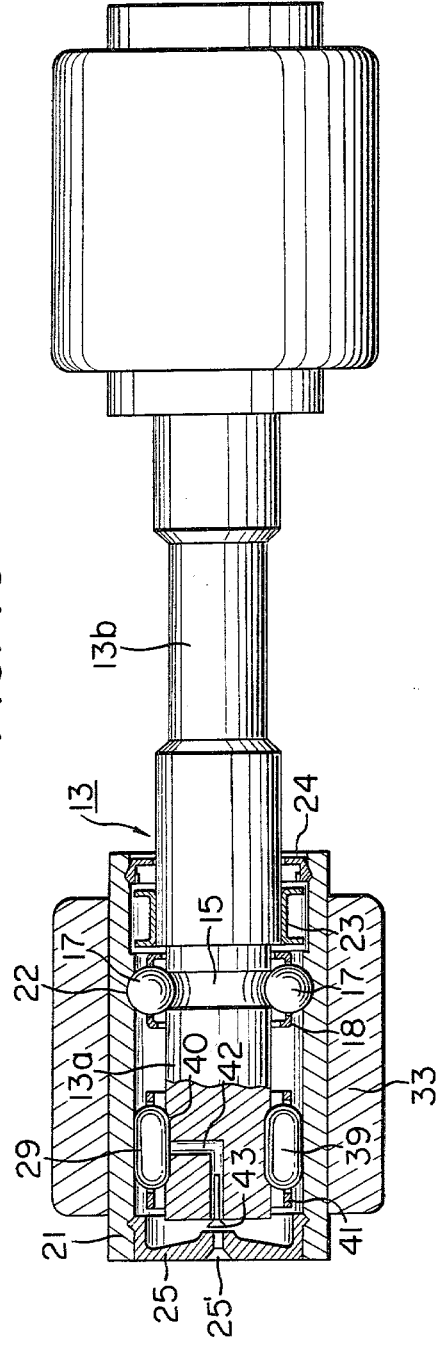

TOP ROLLERS AND METHOD FOR MANUFACTURE THEREOF

BACKGROUND OF THE INVENTION

The present invention relates to top rollers used in fine or rough spinning frames and a method for manufacture thereof.

In the prior art top rollers, a plurality of balls are fitted into and retained with a retainer in circumferentially equidistantly spaced apart relation in each of two axially spaced apart annular grooves formed in the exterior side wall of a rotary section of an arbor and each of two axially spaced apart complementary annular grooves formed in the interior side wall of an outer race rotatably fitted over the rotary section of the arbor, and a rotary shell with a rubber cot is fitted over the outer race with a ring-shaped spring being interposed into a pair of mating grooves formed in the interior side wall of the rotary shell and the exterior side wall of the outer race.

The prior art top rollers with the above construction are disadvantageous in that they are composed of a relatively large number of parts so that their fabrication and assembly are very complex. In addition the smooth rotation of the rotary shell may be not ensured all the time because the rotary shell is connected to the outer race only with the ring-shaped spring so that the former may be easily pulled out of the latter for lubrication purposes. In addition to the play between the rotary shell and the outer race, there exists a play between the outer race and the rotary section of the arbor. Furthermore the ring-shaped spring interposed between the outer race and the rotary shell is made into contact with the latter only at several points on the inner side wall of the rotary shell. Thus the eccentric and nonuniform rotation of top roller tends to occur very frequently.

SUMMARY OF THE INVENTION

Accordingly one of the objects of the present invention is to provide a top roller which may substantially overcome the problems encountered in the prior art top rollers, may eliminate the outer race, may be easily assembled with a minimum number of parts and may ensure smooth and uniform rotation.

Another object of the present invention is to provide a method for manufacture of the top rollers of the type described.

A further object of the present invention is to provide a top roller of the type described which may be lubricated in a simple manner.

Briefly stated, to the above and other ends the present invention provides a top roller wherein a plurality of rollers or balls are fitted into and retained with a retainer in a circumferentially equidistantly spaced apart relation in one of axially spaced apart annular grooves formed in the exterior side walls of a rotary section or portion of an arbor and are made into direct rolling contact with the interior side wall of a rotary shell with a rubber cot fitted over the rotary portion of the arbor, and a plurality of rollers or balls, which may be equal to or greater than the former plurality of rollers or balls in diameter, are retained with a retainer in the other annular groove and a corresponding or complementary annular groove formed in the interior side wall of the rotary shell in a manner substantially similar to that described above. A bearing chamber which is defined between the rotary portion of the arbor and the rotary shell and houses the rolling elements is sealed with a cap with an oil hole at one or outer end and at the other with a flanged sealing means and a shielding ring. Lubrication means is provided to facilitate the lubrication of rolling elements.

BRIEF DESCRIPTION OF THE DRAWINGS

FIGS. 3A, 3B, 4A and 4B show rolling element retainers used in the present invention;

FIG. 5 is a side view, partly in section, of a second embodiment in accordance with the present invention;

FIG. 6 is a sectional view of an rotary section of a split type arbor;

FIG. 7 is a side view, partly in section, of a hook section thereof;

FIG. 8 is a side view, partly in section, of a third embodiment of the present invention wherein the arbor consists of the rotary and hook sections shown in FIGS. 6 and 7, respectively;

FIGS. 9(A) and (9B); and FIGS. 9(C) and 9(D) show two constructions, respectively, of a shielding ring used in the present embodiments; and FIG. 10 is a side view, partly in section, of a fourth embodiment of the present invention.

Same reference numerals are used to designate similar parts throughout the figures.

DESCRIPTION OF THE PREFERRED EMBODIMENTS

Figure 1:
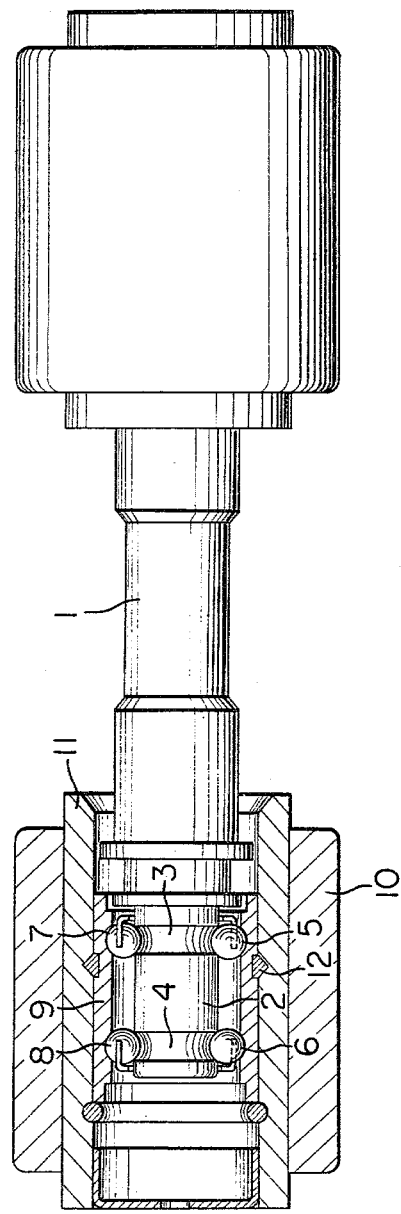
FIG. 1 is a side view, partly in section of a typical prior art top roller.

Prior Art, FIG. 1

Prior to the description of the preferred embodiments of the present invention, a typical prior art top roller will be described briefly in order to distinctly and specifically point out its problems. Referring to FIG. 1 the prior art top roller includes an arbor consisting of a hook portion 1 and a rotary portion 2 which is formed with two axially spaced apart annular grooves 3 and 4 into each of which is fitted a plurality of balls 5 or 6 circumferentially spaced apart from each other by a suitable distance and retained in position by a retainer 7 or 8. An outer race 9 which is fitted over the rotary portion 2 of the arbor has two annular grooves formed in the interior wall thereof into which are fitted the balls 5 and 6. A ring-shaped spring 12 is fitted into an annular space defined by an annular groove formed in the exterior wall of the outer race 9 and an annular groove formed in the interior wall of a rotary shell 11 with a rubber cot 10 so that the rotary shell 11 may be retained in position over the outer race 9.

The top roller with the above construction has the defects that it consists of a relatively large number of components and that the fabrication steps are complex. In addition, the rotary shell 11 has a play because it is connected to the outer race 9 with the ring-shaped spring 12. More particularly since the balls 5 and 6 are interposed between the rotary portion of the arbor and the outer race 9, there exists more or less play therebetween. Furthermore there exists a considerable clearance between the rotary shell 11 and the outer race because, as described above, they are interconnected with the ring-shaped spring 12 so that the rotary shell 11 may be easily pulled out of the outer race 9 for lubrication purposes. Moreover, the ring-shaped spring 12 fitted into the annular groove of the rotary shell 11 is made into supporting or retaining contact with the rotary shell only at several points so that eccentric and nonuniform rotation of the top roller results and accordingly uneven yarn results.

Figure 2:
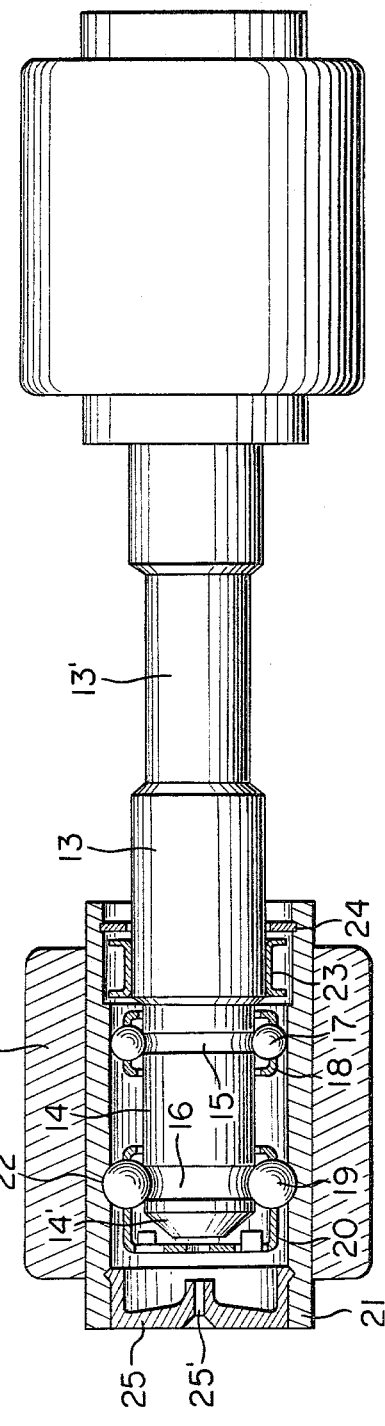
FIG. 2 is a side view, partly in section, of a first embodiment of a top roller in accordance with the present invention.

First Embodiment, FIGS. 2, 3 and 4

Next referring to FIG. 2 the first embodiment of the present invention will be described. An arbor 13 consists of a hook portion 13' and a rotary portion 14 having a small annular groove 15 and a large annular groove 16 formed in the exterior wall thereof and axially spaced apart from each other by a suitable distance, and a plurality of small-diameter balls 17 are fitted into the small annular groove 15, circumferentially spaced apart from each other by a suitable distance and retained in position by means of a retainer 18, whereas a plurality of large-diameter balls 19 are fitted into the large annular groove 16, circumferentially spaced apart from each other by a suitable distance and retained in position by a retainer 20. A rotary shell 21 with a rubber cot 33 fitted over the rotary portion 14 of the arbor 13 has an annular groove 22 formed in the interior wall thereof and fitted with the large-diameter balls 17, the small diameter balls 15 being made into rolling contact with the interior wall of the rotary shell 21.

In order to prevent the intrusion of dust into a space or bearing chamber defined between the rotary portion 14 of the arbor 13 and the rotary shell 21, a flanged seal 23 is fitted over the arbor 13 between the small annular groove 15 and the hook portion 13', and a shielding ring 24 is fitted in the interior of the rotary shell 21 without contacting with the arbor on the side of the flanged seal 23 remote from the small annular groove 50. A cap 25 formed with an oil hole 25' at the center thereof is fitted into the outer open end of the rotary shell 21 remote from the hook portion 13' of the arbor 13.

Next the steps for assembling the top roller with the above construction will be described. First the shield ring 24 is loosely fitted over the hook portion 13' of the arbor 13, and then the flanged seal 23 is fitted over the arbor 13 at a predetermined installation position. Thereafter the small-diameter balls 17 are fitted into the small annular groove 15 of the rotary portion 14 of the arbor 13, circumferentially equidistantly spaced apart from each other and retained in position with the retainer 18.

The construction of the retainer 18 is shown in FIGS. 3(A) and 3(B). The retainer 18 is made of an annular disk 27 having a center opening 26 into which is fitted the rotary portion 14 of the arbor 13, and has a plurality of circumferentially equidistantly spaced apart ball retaining fingers 28 each with ball retaining recesses 28a and 28b. These ball retaining fingers 28 are machined at the outer periphery of the annular disk 27 and bent at right angles in parallel with the axis of the arbor 13. Therefore each small-diameter ball 17 is retained in position in the small annular groove 15 of the rotary portion 14 of the arbor 13 between the opposed ball retaining recesses 28a and 28b of the adjacent ball retaining fingers 28.

After the small-diameter balls 17 are retained in position over the rotary portion 14 of the arbor in the manner described above, the rotary shell 21 is fitted over the rotary portion 14 and the small-diameter balls 17, but the shielding ring 24 is not yet securely fixed in position so that the rotary shell 21 may be freely inclined with respect to the axis of the arbor 13. With the rotary shell 21 in inclined position, the large-diameter balls 19 are fitted into the large annular groove 16 of the rotary portion 14 and the mating annular groove 22 of the rotary shell 21, circumferentially equidistantly spaced apart from each other and retained in position by the retainer 20 when the rotary shell 21 is held in position parallel with the axis of the arbor 13.

The construction of the retainer 20 is shown in detail in FIGS. 4A and 4B. It is made of an annular disk 30 having a central opening 29 and a plurality of equiangularly radially outwardly extending ball retaining fingers 31 each with ball retaining recesses 31a and 31b as best shown in FIG. 4(B). These ball retaining fingers 31 are bent at right angles in parallel with the axis of the arbor 13 as shown in FIG. 4(A).

After the large-diameter balls 19 are retained in position in the annular grooves 16 and 22 by the retainer 20, the shielding ring 24 which has been loosely fitted over the hook portion 13' of the arbor 13 is moved to its installation position and is securely retained in the interior of the rotary shell without contacting with rotary portion 14, and thereafter the cap 25 with the oil hole 25' is fitted into the outer open end of the rotary shell 21.

As shown in FIG. 4, the large-diameter ball retainer 20 may be formed with fanlike blades 32 each extended from each of the ball retaining fingers 31, and as shown in FIG. 2 the free end 14' of the rotary portion 14 of the arbor 13 may be tapered so that grease or lubricant injected through the oil hole 25' of the cap 25 may flow along the tapered surface 14' and then may be directed by the lubricant feeding blades 32 toward the large-diameter balls 19.

As described above, in the first embodiment the rolling elements or large- and small-diameter balls may be retained in position by the retainers very simple in construction so that the assembly may be considerably facilitated as compared with the prior art top rollers.

Second Embodiment, FIG. 5

The second embodiment shown in FIG. 5 is substantially similar in construction to the first embodiment except that both the balls 17 and 19 have the same diameter and accordingly both the annular grooves 15 and 16 are of the same size, that opposed to the first embodiment the balls 17 are fitted into the annular groove 22 of the rotary shell 21 with the rubber cot 33 whereas the balls 19 are made into direct rolling contact with the interior wall of the rotary shell 21, and that an oil passage 34 is formed through the rotary portion 14 of the arbor 13 coaxially thereof and is bent at a right angle to open at the exterior side wall of the rotary portion 14 between the balls 17 and 19, the other opening being in opposed relation with the oil hole 25' of the cap 25.

Third Embodiment, FIGS. 6, 7 and 8

The third embodiment shown in FIGS. 6, 7 and 8 is substantially similar in construction to the second embodiment shown in FIG. 5 except that the arbor 13 is of a two-piece type and consists of separate rotary and hook sections 13a and 13b. As best shown in FIG. 6, the rotary section 13a carrying the balls 17 and 19 and the rotary shell 21 with the rubber cot 33 has an extension 13a' of a reduced diameter extending coaxially of the rotary section 13a toward the hook section 13b. This extension 13a' is fitted into an axial blind hole 13b' drilled or otherwise formed in the hook section 13b coaxially thereof as best shown in FIG. 7. This mating hole 13b' is formed with a vent hole 35 so that air entrapped therein when the extension 13a' of the rotary section 13a is inserted into the mating hole 13b' of the hook section 13b may escape into the surrounding atmosphere so that the close fitting of the extension 13a' into the hole 13b' may be permitted.

Referring particularly to FIG. 8, when the rotary and hook sections 13a and 13b of the arbor 13 are assembled together into a unitary construction in the manner described above, the flanged seal 23 is previously fitted over the hook section 13b, and after the rotary and hook sections 13a and 13b have been securely connected to each other, the shielding ring 24 and the flanged seal 23 are securely retained in their respective installation positions.

The construction of the shielding ring 24 used in the third embodiment is shown in detail in FIG. 9. In one construction shown in FIGS. 9(A) and 9(B) the shielding ring 24 is made of an elastomeric material such as synthetic resin and is formed with an annular groove U-shaped in cross section and defined by outer and inner side walls 36 and 37 and a bottom or upright wall 38 bridging therebetween. The outer side wall 36 is formed with an annular projection 36' which is extended radially outwardly and adapted to fit into an annular groove 44 (See FIG. 6) formed in the interior wall of the rotary shell 21. The inner side wall 37 is so dimensioned that a very small clearance may be provided between the inner side wall 37 and the arbor 13.

The shielding ring 24 with the above construction may positively prevent the intrusion of cotton fibers and dust into a bearing chamber between the rotary section 13a of the arbor 13 and the rotary shell 21 so that the rotary shell 21 may be avoided from being forced to stop or from rotating at nonuniform speeds.

The shielding ring 24 which has the construction shown in FIGS. 9(C) and 9(D) is adapted for use with the first, second and fourth embodiments shown in FIGS. 2, 5 and 10, respectively, and is formed only with the outer side wall or flange 36, and the annular section 38 is so dimensioned that an extremely small clearance may be provided between the inner periphery 38' of the annular section 38 and the arbor 13. This shielding ring 24 may attain the same effects as the shielding ring 24 with the construction shown in FIGS. 9(A) and 9(B). The shielding ring 24 may be previously cut along a line 40 as best shown in FIG. 9(D) so that it is not necessary to previously fit the shielding ring 24 over the hook section 13b prior to the assembly. That is, after the top roller has been assembled, the shielding ring 24 may be fitted over the arbor 13 at a predetermined installation position. When the annular projection 36' is removed from the shielding ring 24 in FIG. 9(C) and the inner diameter of the flange 36 is same as the outer diameter of the rotary shell 21, the shielding ring 24 may be covered over the edge of the rotary shell 21. When the gap in the cut line 45 in FIGS. 9(B) and 9(D) is formed by mounting the shielding ring 24, the gap is connected by an adhesive tape, adhesives and so on.

Fourth Embodiment, FIG. 10

The fourth embodiment shown in FIG. 10 is substantially similar in construction to the second embodiment shown in FIG. 5 except that instead of the balls 19, rollers 39 are used and fitted into a wide groove 40 formed in the exterior wall of the rotary portion 13a of the arbor 13, and retained in position by a retainer 41 having dimensions larger than those of the retainer 20. An oil passage 42 is formed from the edge of the arbor 13 through the rotary portion 14 coaxially thereof and is bent at a right angle to open at the wide groove 40, and a funnel-shaped guide 43 for inserting the tip of a grease gun is inserted in the oil passage 42. The arbor 13 may consist of the integral or separate rotary and hook portions or sections 13a and 13b.

What is claimed is:

1. A top roller, comprising:
    a cylindrical shell having an annular groove in the interior wall thereof;
    a cylindrical rotatable arbor disposed inside and coaxial with said shell, said arbor having two axially spaced grooves therein, one of said arbor grooves being substantially coplanar with said groove in said shell;
    a first plurality of balls of equal size disposed in and extending between said coplanar grooves;
    a second plurality of balls of equal size disposed in the other groove of said arbor and extending between said other groove and an adjacent ungrooved interior wall portion of said shell;
    first and second retainers for retaining said first and second plurality of balls in position respectively;
    said first plurality of balls each having a diameter greater than the diameter of each of said second plurality of balls;
    said arbor having a free end tapered for feeding lubricant to at least one of said plurality of balls,
    the one of said retainers closest to said free end of said arbor having a plurality of lubricant feeding blades.

2. A top roller as set forth in claim 1 wherein a flanged seal is fixed between said rotary section of said arbor and the inner edge of said rotary shell, and a shielding ring consisting of an outer side flange and an annular section is mounted in said inner edge of said rotary shell.

3. A top roller as set forth in claim 2 wherein said shielding ring is covered in the outer edge of said rotary shell.

4. A top roller as set forth in claim 1 wherein a cap having a oil hole in center thereof is covered in the free end of the rotary shell.

* * * * *

UNITED STATES PATENT AND TRADEMARK OFFICE
CERTIFICATE OF CORRECTION

PATENT NO. : 4,183,127
DATED : January 15, 1980
INVENTOR(S) : Takeshi Suzuki

It is certified that error appears in the above—identified patent and that said Letters Patent is hereby corrected as shown below:

Column 2, line 17: Change "an" to --a--.

Column 4, line 25: "FIG. 4" should be --FIGS. 4A and 4B--.

Column 6, line 54: "a" should be --an--.

Signed and Sealed this

Twenty-ninth Day of July 1980

[SEAL]

Attest:

SIDNEY A. DIAMOND

Attesting Officer

Commissioner of Patents and Trademarks

UNITED STATES PATENT OFFICE
CERTIFICATE OF CORRECTION

Patent No. 4,183,127                    Dated   January 15, 1980

Inventor(s)   Takeshi Suzuki

It is certified that error appears in the above-identified patent and that said Letters Patent are hereby corrected as shown below:

Column 2, line 17:   Change "an" to --a--.

Column 4, line 25:   "FIG. 4" should be --FIGS. 4A and 4B--.

Column 6, line 54:   "a" should be --an--.

The following revisions should be effected in the drawings:

Delete "FIG. 3" and insert under this designation before "(A)"

--FIG. 3--; similarly before "(B)" insert --FIG. 3--.

Similarly, "FIG. 4" should be deleted and under the designations for this figure there should be inserted before "(A)", . --FIG. 4-- and before "(B)" --FIG. 4--.

Delete "FIG. 9" and insert under the designations for this figure before "(A)" --FIG. 9-- and before "(B)" --FIG. 9--

UNITED STATES PATENT OFFICE
CERTIFICATE OF CORRECTION

Patent No. 4,183,127   Dated January 15, 1980

Inventor(s) Takeshi Suzuki

It is certified that error appears in the above-identified patent and that said Letters Patent are hereby corrected as shown below:

and before "(C)" --FIG. 9-- and before "(D)" --FIG. 9--.

THIS CERTIFICATE SUPERSEDES CERTIFICATE OF CORRECTION ISSUED July 19, 1980.

Signed and Sealed this

Twenty-eighth Day of October 1980

[SEAL]

Attest:

SIDNEY A. DIAMOND

Attesting Officer

Commissioner of Patents and Trademark